(12) United States Patent
Le Beux et al.

(10) Patent No.: US 6,253,220 B1
(45) Date of Patent: *Jun. 26, 2001

(54) METHOD OF OPTIMIZING THE FILLING OF AN EDITING MEDIUM WITH DIGITAL IMAGES OF VARIABLE SIZES, AND WITH PRESERVATION OF THE SIZE RATIOS

(75) Inventors: Jean-Claude Le Beux, Vincennes; Michel F. Buff, La Frette, both of (FR)

(73) Assignee: Eastman Kodak Company, Rochester, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/090,084

(22) Filed: Jun. 3, 1998

(30) Foreign Application Priority Data

Jun. 9, 1997 (FR) .................................................. 97 07388

(51) Int. Cl.[7] .................................................... G06F 15/00
(52) U.S. Cl. .......................... 707/530; 707/517; 707/519; 707/525; 345/127
(58) Field of Search ..................................... 707/530, 525, 707/526, 517, 518; 345/302, 349, 127

(56) References Cited

U.S. PATENT DOCUMENTS

| 4,751,660 | * | 6/1988 | Hedley ................................. 364/518 |
| 4,928,252 | * | 5/1990 | Gabbe et al. ........................ 707/525 |
| 4,951,233 | * | 8/1990 | Fujiwara et al. .................... 707/525 |
| 5,193,126 | * | 3/1993 | Matsuki ................................. 382/44 |
| 5,390,354 | * | 2/1995 | de Heus et al. .................... 707/517 |
| 5,414,811 | * | 5/1995 | Parulski ............................... 345/501 |
| 5,434,961 | * | 7/1995 | Horiuchi et al. .................... 707/507 |
| 5,526,442 | * | 6/1996 | Baba et al. .......................... 382/132 |
| 5,553,217 | * | 9/1996 | Hart et al. ........................... 707/521 |
| 5,642,443 | * | 6/1997 | Goodwin et al. .................... 382/289 |
| 5,742,837 | * | 4/1998 | Fukui et al. ......................... 707/517 |
| 5,757,952 | * | 5/1998 | Buytaert et al. .................... 383/132 |
| 5,757,953 | * | 5/1998 | Jang ..................................... 382/132 |
| 5,771,308 | * | 6/1998 | Florent ................................. 382/130 |
| 5,809,179 | * | 9/1998 | Marimont et al. .................. 382/254 |
| 5,848,198 | * | 12/1998 | Penn .................................... 382/276 |
| 5,911,146 | * | 6/1999 | Johari et al. ........................ 707/525 |
| 5,917,612 | * | 6/1999 | Yoshida ............................... 358/434 |
| 5,943,679 | * | 8/1999 | Niles et al. .......................... 707/526 |
| 5,946,461 | * | 8/1999 | Landry et al. ....................... 395/117 |
| 6,101,513 | * | 8/2000 | Shakib et al. ....................... 707/527 |

FOREIGN PATENT DOCUMENTS

543414A2 * 5/1993 (EP) .

OTHER PUBLICATIONS

Le et al., Document Image Analysis Using Integrated Image and Neural Processing, Sep. 1995, IEEE, pp. 327–330.*

* cited by examiner

*Primary Examiner*—Heather R. Herndon
*Assistant Examiner*—Cong-Lec Huynh
(74) *Attorney, Agent, or Firm*—William F. Noval

(57) ABSTRACT

The method comprises the steps of sorting the images according to a principal criterion (width or height) and a secondary criterion (height or width) and after having indexed these images, automatically associating the image p−j and the image p+1+j with the same editing row so as to minimize the total useful width of the aggregation of the images, and calculates the maximum enlargement ratio for editing the aggregation of the images on a medium arranged in portrait or landscape mode.

7 Claims, 5 Drawing Sheets

FIG. 5

METHOD OF OPTIMIZING THE FILLING OF AN EDITING MEDIUM WITH DIGITAL IMAGES OF VARIABLE SIZES, AND WITH PRESERVATION OF THE SIZE RATIOS

FIELD OF THE INVENTION

The present invention relates to the editing of digital images, and more particularly to the editing of a plurality of images on a single page of an editing medium.

BACKGROUND OF THE INVENTION

It is well known that several digital images can be edited on the same page of an editing medium. However, such a procedure requires prior preparation in front of a workstation in order to arrange the images one by one on the editing medium, for example by selecting the images and determining the zone in which it is wished to arrange these images. When it is wished to automatically edit several images an editing template is used for filling of the page of the editing medium. This template has zones which are practically identical to each other, intended to receive an image very often in even numbers. When the editing template is chosen, a template is selected which has a number of zones equal to the number of images to be edited or a little greater.

This type of editing is well suited to images of identical sizes such as series of digital images produced by equipment of the MRI or scanner type. It is necessary to know in principle the number of images to be edited on a single page of the editing medium.

Figures 1A, 1B:
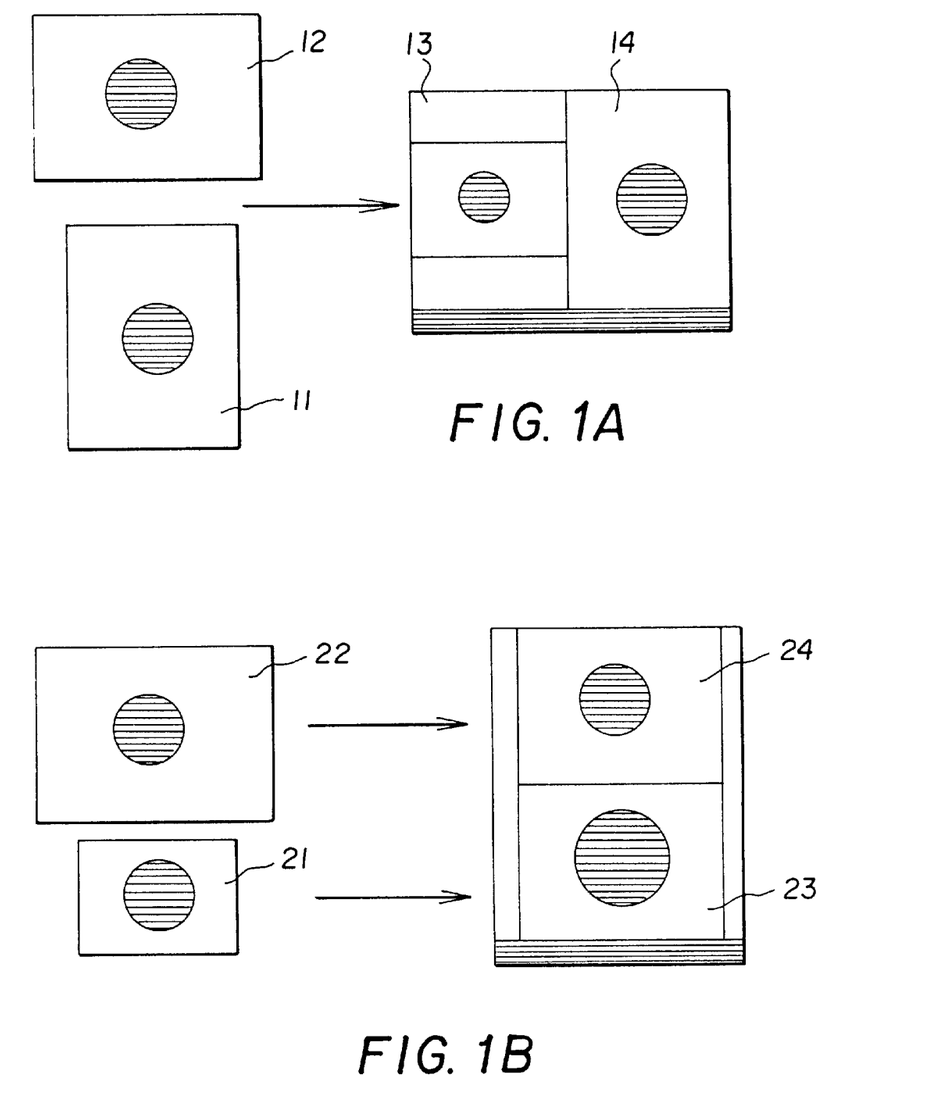
FIG. 1A depicts schematically the editing proposed by the known technique of two radiographs of the same object on two identical plates with a different orientation.
FIG. 1B depicts schematically the editing proposed by the know technique of two radiographs of the same object on two plates of different sizes.

In digital radiography, photoluminescent memory plates are used having different sizes, for example 18 cm×24 cm, 24 cm×30 cm, 35 cm×35 cm, or 35 cm×43 cm. These plates can also be exposed in both possible orientations, as can be seen in FIG. 1A. The larger dimension can be disposed vertically 11, hereinafter referred to as portrait format or arrangement, or the larger dimension can be disposed horizontally 12, hereinafter referred to as landscape format or arrangement. In addition, the image matrices are not necessarily proportional to the cassette sizes, for example a 24 cm×30 cm cassette and a 35 cm×43 cm cassette can have the same matrix of 2000×2500 pixels.

Traditionally, in radiography, the size of the cassette used to produce the image was chosen as a function of the dimension of the part whose image it is wished to obtain. The size of the image was very rapidly assimilated to the size of the medium which was used to record the image. When an editing of two images of an identical object is effected, each image being on a different page of an editing medium, the dimension of the matrix gives rise to an editing in which the objects represented have identical sizes on each editing medium whatever the cassette used. This is because the size of the object depicted or image edited depends on the pixel matrix and not on the physical size of the medium on which the image has been captured, that is to say the size of the cassette.

However, when several images are edited in a conventional fashion on a single page of an editing medium comprising several editing zones of identical dimensions, the existing software packages adapt the external dimensions of the image, for a radiograph of the size of the cassette, to the dimensions of the editing zone. The ratios of enlargements of various edited images or depicted objects can therefore be different when the cassettes do not have the same size or the same orientation.

As can be seen in FIG. 1A, when the images of two identical objects obtained by means of two identical cassettes are edited on a single page of an editing medium, one arranged in portrait format and the other arranged in landscape format, the conventional editing of the images on two editing zones of identical sizes 13 and 14 modifies the enlargement of the images in order to adapt them as well as possible to each editing zone. In the present case the enlargement is determined by the ratio of the greatest size of the image to the width of the zone 13 for the image 12, and to the width of the other zone 14 for the image 11. The result gives rise to two images of different sizes, as depicted.

As can be seen in FIG. 1B, when the images of two identical objects obtained by means of two different cassettes 21 and 22 are edited on a single page of an editing medium having two identical editing zones 23 and 24, the adaptation of the images obtained in the usual fashion to editing zones of identical sizes gives rise to images with different enlargements.

When an editing template is chosen, it may turn out that the number of images to be edited does not correspond to any available template. In this case, the user chooses a template having more editing areas than images to be edited and certain zones will be left empty. This happens for example when the available templates have an even number of editing zones and it is wished to edit an odd number of images.

In some applications, and in particular in radiography, the reader must be able to evaluate the dimensions of one organ or another on several views. It is therefore important, at final editing, to preserve, between these images, the enlargement ratios existing between the original images.

When it is desired to preserve the existing enlargement ratio between the original images, it is necessary to apply, to all the images, an enlargement coefficient calculated by means of the ratio between the dimension of the largest image and the dimension of the zones receiving the image, zones which are identical. When several images are edited on a single page with preservation of the enlargement ratio between these images, the same enlargement coefficient is applied to all the images. In these circumstances the images formed on radiographic plates of small size do not fill all the surface of the editing zone and the surface of the editing medium is not optimally used.

SUMMARY OF THE INVENTION

There is therefore a need for a method of filling the editing medium which makes it possible to improve the use of the surface of the editing medium.

The invention provides a method of optimizing the filling of an editing medium of given size for the display on this medium of a plurality of individual original images all having the same enlargement. This method comprises the steps of: a) orienting the images in their normal observation orientation; b) determining a useful width ($L_i$) and a useful height ($H_i$) for each original image disposed in this normal observation orientation; c) forming a virtual representation of an editing medium in one of the available formats, portrait or landscape, and containing the plurality of the individual original images to be edited; d) calculating the useful width and the useful height of the virtual representation made at step c); e) calculating a first maximum enlargement to be applied to the virtual representation to be edited on the editing medium when the editing medium is presented in a portrait format so that all the images are entirely contained within the editing medium and a second maximum enlargement to be applied to the virtual representation to be edited on the editing medium when the editing medium is presented in a landscape format so that all the images are entirely contained within the editing medium; f) editing the images in the arrangement corresponding to the highest figure of said first or second maximum enlargement.

In a preferred embodiment the images are distributed among several virtual juxtaposed rows. The distribution being obtained by classifying the original images to be edited according to a principal criterion corresponding to one of the respective dimensions of each of these original images and according to at least one secondary criterion corresponding to the other dimension of the original images.

Other advantages and aims of the invention will emerge from a reading of the description which follows, given with reference to the accompanying drawings.

DETAILED DESCRIPTION OF THE INVENTION

Figure 5:
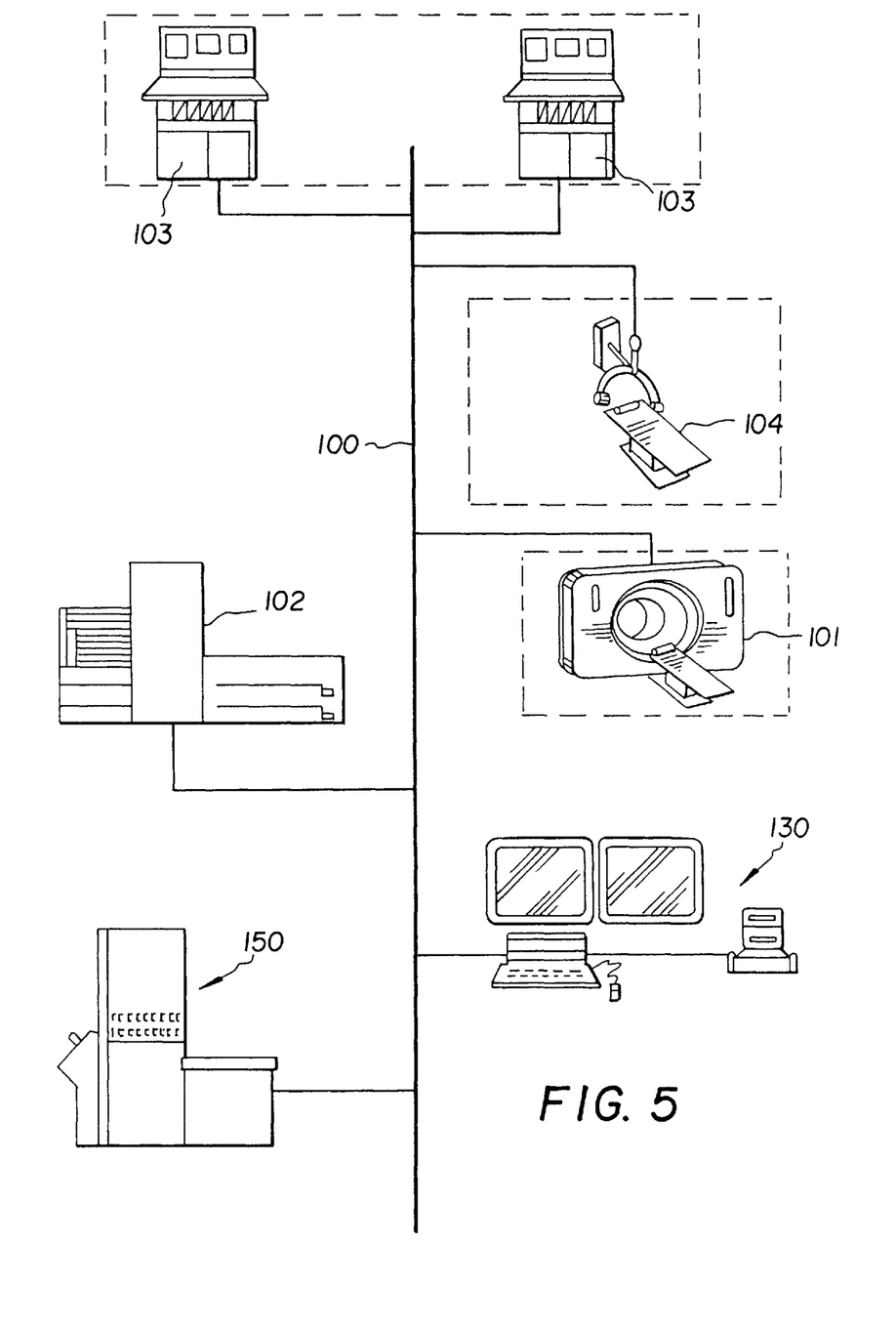
FIG. 5 depicts a known system for the automatic editing of digital images which can be used for implementing the method according to the invention.

As can be seen in FIG. 5, hospitals or large medical imaging laboratories have several types of equipment used to carry out various types of examination. These equipment send image files over the bus 100 of a network to a computer (not shown) for recording these images and editing them as required. The figure depicts a CT scanner 101, a photoluminescent memory plate scanner 102, an echography machine 103 and a digitized table 104. Obviously it is possible to use other types of equipment such as for example an MRI scanner and that the installation can comprise several items of equipment of the same type. Generally, the images files generated by the various equipments have an indication of date and time creation.

When it is wished to edit several images corresponding to the same patient on one and the same page of an editing medium, an operator selects, by means of a workstation 103, the images to be edited on the page. Obviously the images selected can come from one or more imaging appliances. The workstation sends a digital file to an editing station 150 after producing the page to be edited by means of the method according to the invention.

In the known editing technique, the information relating to the number of images to be edited on a single page of the editing medium is used immediately for selecting the choice of an editing template. The reproduction equipment itself fills the editing zones of the template, on receiving each image received, applying a given enlargement coefficient individually to each image received in order to use the surface of each editing zone as well as possible according to the dimension of the plate used for the recording.

In the method according to the invention, an aggregation of the images to be edited is performed and the enlargement coefficient to be used is determined in order to make the dimensions of this aggregation correspond to the dimensions of the editing medium. It is clear that in an automatic editing system the user can supply in advance the number of images to be edited per page of editing medium, and the software will wait, in order to produce the aggregation, until it has received all the images to be edited. It is also clear that the operator can select the images to be edited on a list offered by the workstation, optionally by means of tiny images. After reception of all the information to be edited on a single page of the editing medium, the equipment automatically determines the best arrangement of the images on the editing page.

It was noticed that a page of an editing medium was generally rectangular and could take two different orientations, either portrait or landscape. It was also remarked that the images were usually rectangular having a portrait or landscape orientation. Under these circumstances, it was deemed that it would be judicious to associate images of different sizes in order to attempt to optimize the filling of a page of an editing medium.

In the following description, the size of the images relates to the actual physical size of the images (width, height) and not to the dimension of the matrices (Mx, My) defining these images. Each image is determined by its size (Mx.d, My.d), in which d represents the distance between the pixels, Mx the number of pixels in the image in the horizontal direction and My the number of pixels in the image in the vertical direction. It is clear that, although the physical dimensions of a page of an editing medium are identical when it is presented in portrait or landscape, the useful dimensions of the editing surface can be different. It is in fact possible to have different margins on the four edges of this page of the editing medium and the formatting software will have to take account of this possibility. In general the editing media are also provided with a cartridge in which there are entered various items of information and notably the name of the patient and the laboratory which performed the editing. As can be seen in FIGS. 2D and 3D, the useful dimensions of a page of an editing medium in portrait format are $L_L$ and $L_h$ and those of a page of an editing medium in landscape format are $L'_L$ and $L'_h$.

For constructing a page of an editing medium it is necessary to define the general arrangement of the images and then the formatting of these images. Once this formatting has been performed the method according to the invention determines the orientation of the page of the editing medium according to the largest enlargement for the images.

The method according to the invention sets out to automate the formatting of a plurality of images of different dimensions. First of all the various operations used by the method according to the invention will be presented briefly, and then each of these operations will be explained in more detail.

Figure 2A:
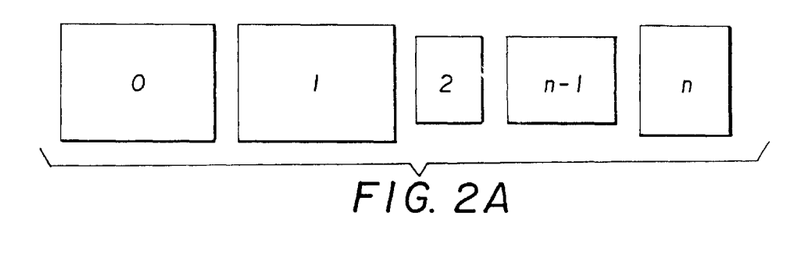
FIGS. 2A to 2D depicts schematically the steps used by the method according to the invention in a first embodiment.
Figure 2B:
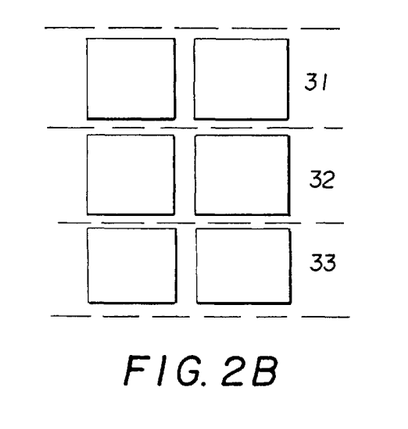
Figure 2C:
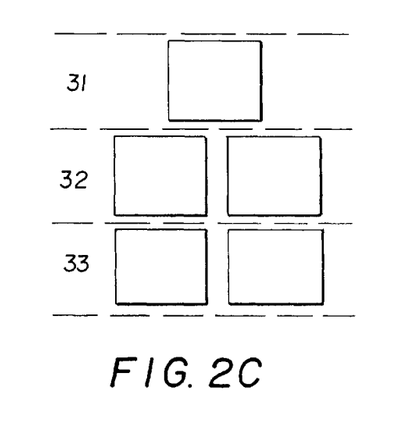
Figure 2D:
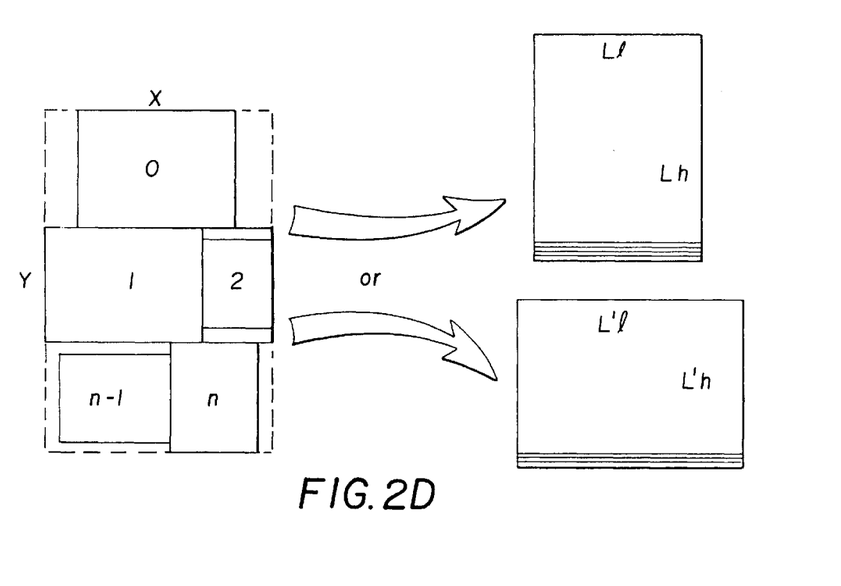

In a first embodiment, shown diagrammatically in FIGS. 2A to 2D, the method according to the invention uses a formatting according to a portrait mode. As can be seen more particularly in FIGS. 2B and 2C, the images are disposed in horizontal parallel rows 31, 32, 33. The first embodiment described by the sequence is particularly advantageous for a number of images less than nine images. FIG. 2B depicts a possible arrangement for an even number of images and FIG. 2C depicts a possible arrangement for an odd number of images.

Once the images have been arranged in the rows, the latter are juxtaposed with each other according to the height of the page in order to obtain a compact virtual image of the arrangement determined by the method according to the invention. The maximum space taken by this arrangement is then determined and a calculation is made of the enlargement ratios to be applied to this compact virtual image in order to make it fit within the page of the editing medium when this page is presented either in portrait format or in landscape format. The method according to the invention selects the landscape format or portrait arrangement for the page of the editing medium which allows the greatest enlargement.

After this selection, the method determines the editing parameters mentioned in FIG. 4 and edits the page of the editing medium.

In a first embodiment, which is particularly effective for editing a maximum of eight images which can present distinct aspect ratio, the images are first of all oriented in their normal orientation direction for being observed. This is because, since these images have to be looked at at the same time, possibly in order to compare them, it is wise and desirable to preserve such an orientation for the comfort of the user, possibly to the detriment of the optimization of the use of the useful surface of the page of the editing medium.

Once the images have been oriented correctly, the dimensions of each image are determined. In the embodiment used, the dimensions are determined by the size of the support which was used for exposure to X-rays. However, since the images are digital images, it is possible to determine the actual dimensions of the image by multiplying the number of pixels in the matrix representing the image by the distance between the pixels. It is thus possible to determine the width of the image by using the formula Mx.dx in which Mx represents the number of pixels in the horizontal direction and dx the distance between two adjacent pixels in this direction, and the height of the image by using the formula My.dy in which My represents the number of pixels in the vertical direction and dy the distance between two adjacent pixels in this direction. The digital image can be processed in this way in order to determine the useful dimensions of this image automatically. It is for example possible to eliminate the edge zones which contain no information and for which the pixel density is constant so as to preserve only the zone in which the image is situated. This can easily be achieved for the radiography of limbs, for which the edge zones are relatively important. It will also be possible, in certain utilizations, to determine visually the useful zone of an image or a plurality of images which it is wished to edit thereafter on a page of the editing medium.

Once the dimensions of width $L_i$ and height $H_i$ of each image have been determined, these images are ordered as shown in FIG. 2A. A first list of images is produced by effecting a first sorting with the width $L_i$ of the image i as the main criterion, with the height $H_i$ of the image i as the secondary criterion, and with another secondary criterion which is the age of the image. Each criterion is ordered in a decreasing direction. A second ordered list of the images is created by choosing, as the first part of the list, the first half of the first list ordered in the same way and taking as the second part the second half which is ordered with the width main criterion decreasing, the height related second criterion increasing and optionally the age criterion decreasing. The images are then distributed as depicted in FIG. 2.

It is obvious that this method of associating two images with the same horizontal row is equivalent to the one obtained from the first list ordered by indexing the images in this list from "0" to "2p" when there is an odd number of images and from "1" to "2p" when there is an even number of images. Where the number of images is even, a notional image indexed "0" is created, of nil width and nil height, and distributing the images in horizontal virtual rows by associating, in a virtual row k, the image indexed p−j with the image indexed p+1+j with $0 \leq j < p$ and k=p−j. The virtual row "0" consists of the image indexed "0".

For each virtual row, a first calculation of the width occupied by the image or images is made by adding the widths of the images $$L_{row\ p-j} = L_{p-j} + L_{p+1+j}$$

and a second calculation of the height of the virtual row is also made $$H_{row\ p-j} = \max(H_{p-j}, H_{p+1+j})$$

The useful width of the virtual image formed by the juxtaposition of the virtual rows is then determined by the following formulae:

$$X = \max_{p-j}^{0 \leq j < p} (L_{row})$$

$$Y = \sum_{p-j}^{0 \leq j < p} H_{row}$$

When the dimensions of the virtual image have been determined, a calculation is made of the enlargement coefficient to the applied to the distribution of the images made in a portrait distribution on an editing medium disposed in portrait format by formula:

$$G_p = \min\left(\frac{L_l}{X}, \frac{L_h}{Y}\right)$$

and to the same distribution disposed on an editing medium disposed in landscape format by formula:

$$G'_l = \min\left(\frac{L'_l}{X}, \frac{L'_h}{Y}\right)$$

A determination is made as to which of the enlargement coefficients is the largest and the format which is associated with this enlargement is used for editing.

Figure 4A:
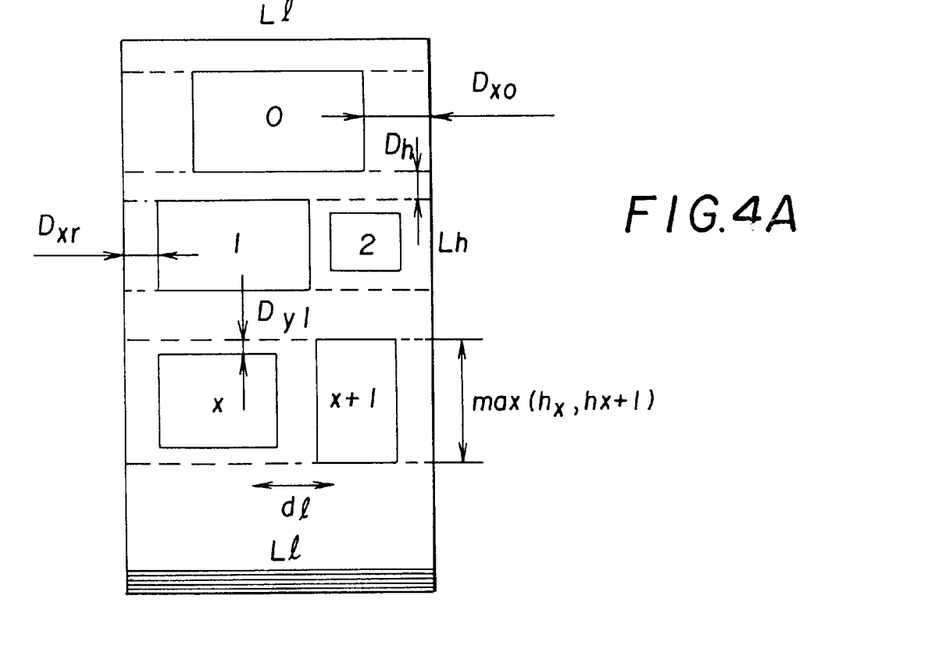
FIGS. 4A and 4B depict schematically the various elements to be taken into account during the final editing of the images on the editing medium.

Reference should be made to FIG. 4A in order to understand more easily the following description given for an editing in which the editing medium is arranged in portrait format. As can be seen, a determination is made of the value $D_{x0}$ for centering the image indexed "0" on the editing medium by formula $D_{x0} = ((L_1 - L_0)/2)G_p$. The inter-image horizontal space is determined for each row by formula $D_{x\ row\ p-j} = (1/3)(L_l - L_{row\ p-j})G_p$. The inter-row vertical space is determined by formula $D_h = (1/z)(L_h - Y)G_p$ in which z is equal to p+1 when the number of images to be edited is even and is equal to p+2 when the number of images to be edited is odd. The images in the row are centered vertically by calculating the vertical shift to be applied by formula $$D_{y\ row\ p-j} = (1/2)(\max(H_{p-j}, H_{p+1+j}) - H_i)G_p.$$

The parameters to be calculated when the editing medium is arranged in landscape format will now be studied for the same portrait arrangement of the images. As can be seen, a determination is made of the value $D_{x0}$ for horizontally centering the image indexed "0" on the editing medium in landscape format by formula $D_{x0}=((L'_1-L_0)/2)G'_1$. The inter-image horizontal space is determined for each row by formula $$D_{x\ row\ p-j}=(\tfrac{1}{3})(L'_1-L_{row\ p-j})G'_1.$$

The inter-row vertical space is determined by formula $$D_h=(1/z)(L'_1-Y)G'_1$$

in which z is equal to p+1 when the number of images to be edited is even and is equal to p+2 when the images to be edited is odd. The image i is centered vertically in the row by calculating the vertical shift to be applied by formula $$D_{y\ row\ p-j}=(\tfrac{1}{2})(\max(H_{p-j},H_{p+1+j})-H_i)G'_1.$$

Figure 3A:
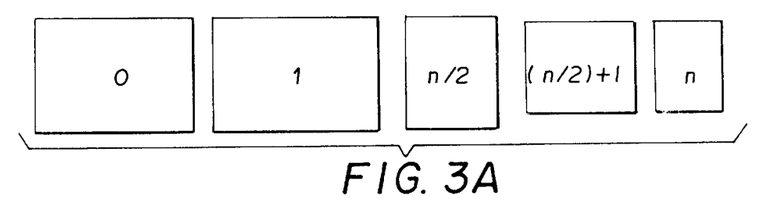
FIGS. 3A to 3D depict schematically the steps used by the method according to the invention in a second embodiment.
Figure 3B:
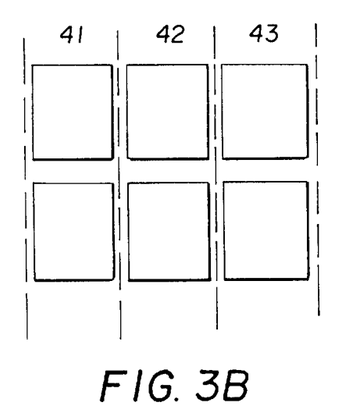
Figure 3C:
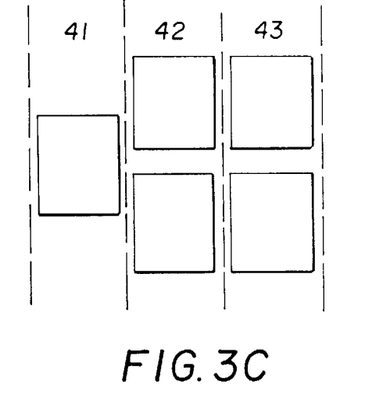
Figure 3D:
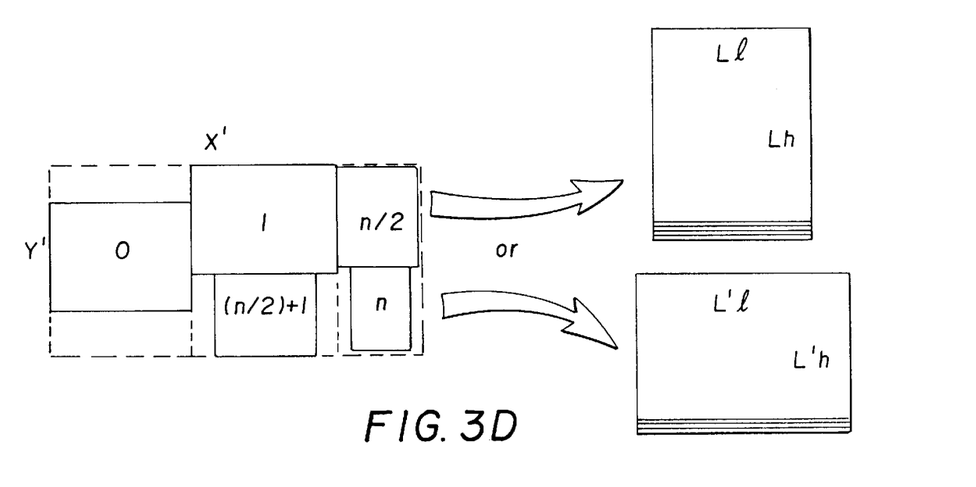

In a second embodiment, which is particularly effective for editing a maximum of eight images, a landscape arrangement is used for presenting the images. This type of arrangement is depicted schematically by FIGS. 3B and 3C, in which the images are arranged in vertical parallel rows 41, 42, 43. After, as previously indicated, having oriented the images in their normal direction of orientation for observing them and having determined the dimensions of each image, these images are ordered as depicted in FIG. 3A. A first list of the images is produced by effecting a first sorting with the height $H_i$ of the image i as the main criterion, with the width $L_i$ of the image i as the secondary criterion and with another secondary criterion which is the age of the image. Each criterion is ordered in a decreasing direction. A second ordered list of the images is created by choosing, as the first part of the list, the first half of the first list ordered in the same way and taking as the second part the second half of the first list which is ordered with the height main criterion in an increasing order, the second subsidiary width criterion in an increasing order and optionally the age criterion in a decreasing order. The images are then distributed as shown in FIG. 3.

It is obvious that this method of associating two images with the same vertical row is equivalent to the one obtained from the first list ordered by indexing the images in this list from "0" to "2p" when there is an odd number of images and from "1" to "2p" when there is an even number of images. Where the number of images is even, a notional image indexed "0" is created, of nil width and nil height, and distributing the images in virtual rows by associating, in a virtual row k, the image indexed p−j with the image indexed p+1+j with $0 \leq j<p$ and k=p−j. The virtual row "0" consists of the image indexed "0".

For each virtual row, a first calculation of the width occupied by the image or images is made by adding the widths of the images $$H'_{row\ p-j}=H_{p-j}+H_{p+1+j}$$

and a second calculation of the height of the virtual row is also made $$L'_{row\ p-j}=\max(L_{p-j},L_{p+1+j})$$

The useful width of the virtual image formed by the juxtaposition of the virtual rows is then determined by the following formulae:

$$X' = \sum_{p-j}^{0 \leq j<p} L'_{row}$$

$$Y' = \max_{p-j}^{0 \leq j<p}(H'_{row})$$

When the dimensions of the virtual image have been determined, a calculation is made of the enlargement coefficient to the applied to the distribution of the images made in a landscape distribution on an editing medium disposed in landscape format by formula:

$$G'_l = \min\left(\frac{L'_l}{X'},\frac{L'_h}{Y'}\right)$$

and to the same distribution disposed on an editing medium disposed in portrait format by formula $$G'_p = \min\left(\frac{L_l}{X'},\frac{L_h}{Y'}\right)$$

A determination is made as to which of the enlargement coefficients is the greatest and the format which is associated with this enlargement is used for editing.

Figure 4B:
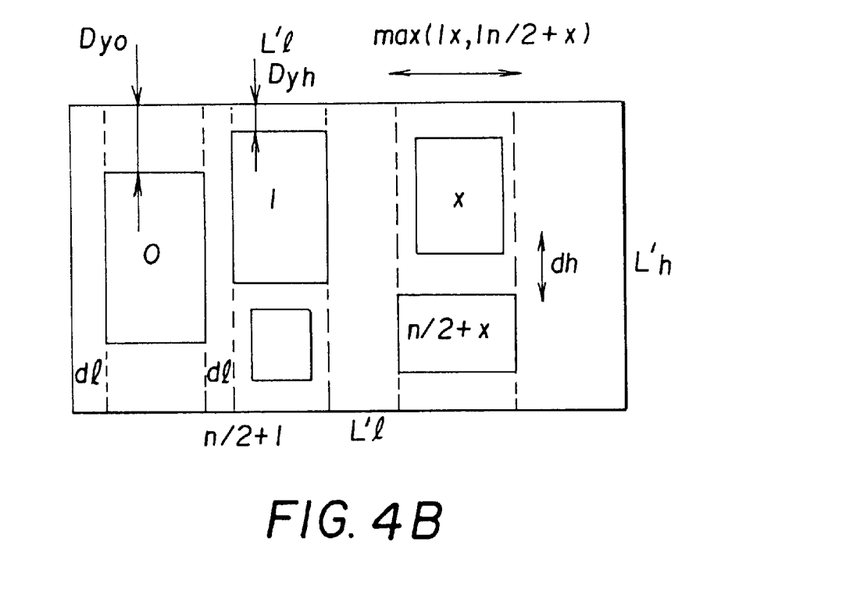

Reference should be made to FIG. 4B in order to understand more easily the following description given for an editing in which the images are arranged in landscape format and the editing medium is arranged in portrait format. As can be seen, a determination is made of the value $D_{y0}$ for vertically centering the image indexed "0" on the editing medium by formula $D_{y0}=((L_h-H_0)/2)G_p$. The inter-image vertical space is determined for each vertical row by formula $$D_{y\ row\ p-j}=(\tfrac{1}{3})(L_h-L'_{row\ p-j})G_p.$$

The inter-row horizontal space is determined by formula $$D_1=(1/z)(L_v-X')G_p$$

in which z is equal to p+1 when the number of images to be edited is even and is equal to p+2 when the number of images to be edited is odd. The images in the row are centered horizontally by calculating the horizontal shift to be applied by formula $$D_{y\ row\ p-j}=(\tfrac{1}{2})(\max(H_{p-j},H_{p+1+j})-H_i)G_p.$$

The editing parameters for a distribution arranged in landscape format when the editing medium is arranged in landscape format will now be studied. As can be seen, a determination is made of the value $D_{y0}$ for vertically centering the image indexed "0" on the editing medium in landscape format by formula $$D_{y0}=((L'_h-L_0)/2)G'_1.$$

The inter-image vertical space is determined for each row by formula $$D_{y\ row\ p-j}=(\tfrac{1}{3})(L'_h-H'_{row\ p-j})G_1.$$

The inter-row horizontal space is determined by formula $$D_h=(1/z)(L'_1-Y')G_1$$

in which z is equal to p+1 when the number of images to be edited is even and is equal to p+2 when the images to be edited is odd. The image i is centered vertically in the row by calculating the horizontal shift to be applied by formula $$D_{x\ row\ p-j} = (\tfrac{1}{2})(\max(L_{p-j}, L_{p+1+j}) - L_i)G_1.$$

It is obvious that the device incorporating the invention can, before editing, implement the method according to the first embodiment and then the second embodiment. In these circumstances, the method according to the invention edits the images either in portrait or in landscape presentation on an editing medium which can be disposed in portrait mode or in landscape mode.

In a third embodiment, it is seen that, if the size of the radiological plate used is taken as the image format, for example 18 cm×24 cm, 24 cm×30 cm, 35 cm×35 cm and 35 cm×43 cm, presented either in portrait format or in landscape format, there is a given finite number of possibilities of having a given number of images of different dimensions to be edited. It is therefore possible to determine, by means of calculation with a powerful computer or empirically, a specific arrangement with a specific format of the editing medium, for example portrait or landscape. In these circumstances a multiple input table makes it possible to provide, as an output, the arrangement of the various images, the enlargement and the arrangement of the medium.

Such arrangements can be calculated in advance by a high-power computer. The computer will be programmed so as to be able to transpose the arrangement of the images within all the rows and will automatically calculate the enlargement ratio to be used in order to make all this arrangement of the images fit on the editing medium. Once the enlargement ratio has been calculated, two images of different formats and/or arrangements will be transposed, and the possible new enlargement ratio will be calculated. This enlargement ratio and this arrangement will be stored in memory if the ratio is above than that previously recorded. Then the transposition of the images will be recommenced a given number of times so as to obtain a configuration in which the enlargement coefficient is at its maximum. It is clear that these programming techniques are the province of those of ordinary skill in the art of computing and that it is possible to use various techniques in which a choice may be made to voluntarily accept a configuration which does not have a maximum enlargement coefficient in order to allow better subsequent optimization. The final arrangement adopted will be that for which the enlargement ratio is the greatest. The programming technique could use for example probabilistic minimization technique described, for example, in "Stochastic Relaxation, Gibbs Distributions, and Bayesian Restoration of Images by S. and D. Geman, IEEE Trans. on PAMI, Vol PAMI-6, November 1984, pp 721–741. Such a calculation no longer needs to be rapid since it is carried out in advance once and for all and its result is entered for all the editing systems. In these calculations, more than two images can be arranged on the same row. For example, for two 35 cm×43 cm plates in landscape format and three 24 cm×30 cm plates in portrait format it seems that the association of the two 35 cm×43 cm plates on one row and three 24 cm×30 cm plates on another row gives a very compact landscape format since the resulting overall virtual image has a width of 86 cm and a height of 65 cm. The same applies if one of the three 24 cm×30 cm images is arranged in landscape mode. Such arrangements cannot be provided by the first two embodiments described previously. It is clear that, for the editing of more than eight images on the page of an editing medium, it is preferable to have recourse to a prior calculation making it possible to determine an optimum arrangement The invention is particularly useful in applications where it is necessary to preserve the same enlargement between the images. It is applicable for digital images, whether or not these result from digital radiography or a medical imaging system. It is clear in radiography that the enlargement ratio of the images is "1". However, the invention is not limited to the use of a unitary enlargement. The invention preserves the enlargement ratio which exists between the original images.

The invention has been described in detail with particular reference to certain preferred embodiment thereof, but it will be understood that variations and modifications can be effected within the spirit and scope of the invention.

PARTS LIST
11 vertical image
12 horizontal image
13, 14 editing zones
21, 22 cassettes
23, 24 identical editing zones
31, 32, 33 horizontal parallel rows
41, 42, 43 vertical parallel rows
100 bus
101 CT scanner
102 photoluminescent memory plate scanner
103 echography machine
104 digitized table
150 editing station

What is claimed is:

1. Method of optimising the filling of an editing medium of given dimensions for editing a plurality of individual original images the editing preserving the enlargement ratio existing between the original images and at least one original image having a different format from the others, a method in which the various steps are taken in the following order:

a) orienting the images in their normal observation orientation;

b) determining a useful width and a useful height for each original image disposed in this normal observation orientation;

c) sorting the images according to a principal criterion corresponding to one of the respective dimensions of each of these images and according to at least one secondary criterion corresponding to the other dimension of the images; d) distributing the images sorted according step c) on a virtual editing medium in one of the available formats, portrait or landscape, by creating several virtual rows, each comprising at least one original image;

e) calculating the useful width and the useful height of each virtual row resulting from the distribution made at step d);

f) calculating a first maximum enlargement coefficient to be applied to the juxtaposition of all the rows to be edited on the editing medium when the editing medium is presented in a portrait format so that all the images are entirely contained within the editing medium and a second maximum enlargement coefficient to be applied to the juxtaposition of all the rows to be edited on the editing medium when the editing medium is presented in a landscape format so that all the images are entirely contained within the editing medium;

g) editing the images in the arrangement corresponding to the highest figure of the first and second maximum enlargement coefficient;

wherein step c) is performed by:

I. drawing up a first ordered list of the original images by sorting images with the width as the decreasing principal criterion and the height as the decreasing secondary criterion and II. drawing up a second ordered list by selecting the first part of the second list as the first half of the first list and generating the second part of the second list by ordering the second half of the first list with the width as the decreasing principal criterion and the height as the increasing secondary criterion, and wherein the images are distributed in horizontally arranged rows.

2. Method according to claim 1 wherein steps d) to f) are repeated, using whichever of the available formats has not been used during the distribution of the images in a distribution into one of the possible formats made previously and wherein during step g) the images are edited in the arrangement corresponding to the highest of the various enlargement coefficients calculated at steps f).

3. Method according to claim 1, for editing a maximum of eight images in which a maximum of two images per row are arranged.

4. Method according to claim 1 wherein the images are indexed from 0 to 2p when an odd number of images in the first list are edited and from 1 to 2p when an even number of images are edited together with the creation of an image of nil width and nil length indexed 0, and wherein the images indexed p−j and p+1+j are associated on the same row.

5. Method according to claim 1 wherein the useful dimensions of a row are calculated, in the direction parallel to the orientation of the row, by the summation of the respective dimensions of each image in this direction and, in the direction perpendicular to the orientation of the row, by the maximum value of the dimensions, measured in this perpendicular direction, of the images arranged in this row.

6. Method of optimising the filling of an editing medium of given dimensions for editing a plurality of individual original images the editing preserving the enlargement ratio existing between the original images and at least one original image having a different format from the others, a method in which the various steps are taken in the following order:

a) orienting the images in their normal observation orientation;

b) determining a useful width and a useful height for each original image disposed in this normal observation orientation;

c) sorting the images according to a principal criterion corresponding to one of the respective dimensions of each of these images and according to at least one secondary criterion corresponding to the other dimension of the images;

d) distributing the images sorted according step c) on a virtual editing medium in one of the available formats, portrait or landscape, by creating several virtual rows, each comprising at least one original image;

e) calculating the useful width and the useful height of each virtual row resulting from the distribution made at step d);

f) calculating a first maximum enlargement coefficient to be applied to the juxtaposition of all the rows to be edited on the editing medium when the editing medium is presented in a portrait format so that all the images are entirely contained within the editing medium and a second maximum enlargement coefficient to be applied to the juxtaposition of all the rows to be edited on the editing medium when the editing medium is presented in a landscape format so that all the images are entirely contained within the editing medium;

I 1. drawing up a first ordered list of the original images by sorting the images with the height as the decreasing principal criterion and the width as decreasing secondary criterion II 2. drawing up a second ordered list by selecting the first part of the second list as the first half of the first list and generating the second part of the second list by ordering the second half of the first list with the height as the decreasing principal criterion and the width as the decreasing secondary criterion, and in which the images are distributed in vertically arranged rows.

7. Method according to claim 6 wherein the images are indexed from 0 to 2p when an odd number of images in the first list are edited and from 1 to 2p when an even number of images are edited together with creation of an image of nil width and nil length indexed 0, and in which the images indexed p−j and p+1+j are associated on the same row.

* * * * *